(12) United States Patent
Wright

(10) Patent No.: US 9,326,456 B2
(45) Date of Patent: May 3, 2016

(54) AGRICULTURAL WRAP AND METHOD OF MAKING THE SAME

(71) Applicant: William Edward Wright, Fort Myers, FL (US)

(72) Inventor: William Edward Wright, Fort Myers, FL (US)

(*) Notice: Subject to any disclaimer, the term of this patent is extended or adjusted under 35 U.S.C. 154(b) by 104 days.

(21) Appl. No.: 14/335,347

(22) Filed: Jul. 18, 2014

(65) Prior Publication Data

US 2016/0014975 A1  Jan. 21, 2016

(51) Int. Cl.
*A01G 9/02* (2006.01)
*A01G 27/00* (2006.01)

(52) U.S. Cl.
CPC ............... *A01G 9/02* (2013.01); *A01G 27/008* (2013.01)

(58) Field of Classification Search
CPC ..... A01G 25/02; A01G 27/006; A01G 9/122; A01G 9/124; A01G 9/1438; A01G 2009/1446; A01G 2009/1453; A01G 2009/1461
USPC ............. 47/21.1, 29.7, 31, 31.1, 65.5, 79, 32, 47/65.7, 65.8, 48.5
See application file for complete search history.

(56) References Cited

U.S. PATENT DOCUMENTS 3,059,378 A * 10/1962 Noras ................. A01G 13/0281 47/32
3,205,619 A * 9/1965 Henry ................. A01G 13/0268 239/566
3,613,309 A * 10/1971 Coburn ............... A01G 27/005 239/145
3,733,745 A * 5/1973 Ingerstedt ................ A01G 9/02 47/56

(Continued)

FOREIGN PATENT DOCUMENTS

IT    WO 8600494 A1 * 1/1986 ............. A01G 31/02
WO   WO 2004002834 A2    1/2004

OTHER PUBLICATIONS

Unknown Author, "Smart Growing System", May 6, 2014 or earlier, http://www.treebag.com/.
Unknown Author, "The Original Root Pruning Container System", May 6, 2014 or earlier, http://www.rootmaker.com/system_aboveground.php#jump.
Unknown Author, "DIY Grow Bags—Window Screens & Mesh", May 6, 2014 or earlier, http://forums2.gardenweb.com/forums/load/contain/msg052156392385.html.
Unknown Author, "DIY Grow Bags", May 6, 2014 or earlier, http://forums2.gardenweb.com/forums/load/contain/msg1015462314673.html.
Sorin, "Vertical Gardening Ideas . . . Tube Planters", Jan 22, 2015 or earlier, http://www.gardeninggonewild.com/?p=14070.

*Primary Examiner* — David Parsley
*Assistant Examiner* — Danielle Clerkley
(74) *Attorney, Agent, or Firm* — George F. Wallace

(57) ABSTRACT

An agricultural wrap includes a continuous planar main body formed of a flexible and permeable material, an amount of growing matter, and at least one irrigation tube. The body has first and second sides, first and second ends, an inner surface, an outer surface disposed against a base surface, and at least one aperture. With the growing matter disposed against the inner surface, the first and second sides are positioned around the growing matter to define a holding pocket. An irrigation tube being disposed against the main body and above the base surface leaks water that permeates through the main body and saturates the growing matter.

19 Claims, 2 Drawing Sheets

(56) References Cited

U.S. PATENT DOCUMENTS

| | | | | |
|---|---|---|---|---|
| 3,860,172 A | * | 1/1975 | Platt | A01G 25/00 239/65 |
| 3,872,621 A | * | 3/1975 | Greenbaum | A01G 9/104 206/423 |
| 3,979,146 A | | 9/1976 | Berg | |
| 4,918,861 A | * | 4/1990 | Carpenter | A01G 31/001 47/59 R |
| 5,030,031 A | | 7/1991 | Brown | |
| 5,201,141 A | * | 4/1993 | Ahm | A01G 31/02 47/59 R |
| 7,226,240 B2 | | 6/2007 | Tyler | |
| 7,452,165 B2 | | 11/2008 | Tyler | |
| 8,439,607 B2 | | 5/2013 | Tyler | |
| 2008/0282609 A1 | * | 11/2008 | Nelson | A01G 13/0268 47/48.5 |
| 2011/0094154 A1 | * | 4/2011 | Joaquin | A01G 1/046 47/65.8 |
| 2012/0159843 A1 | * | 6/2012 | Whitcomb | A01G 13/0281 47/21.1 |

* cited by examiner

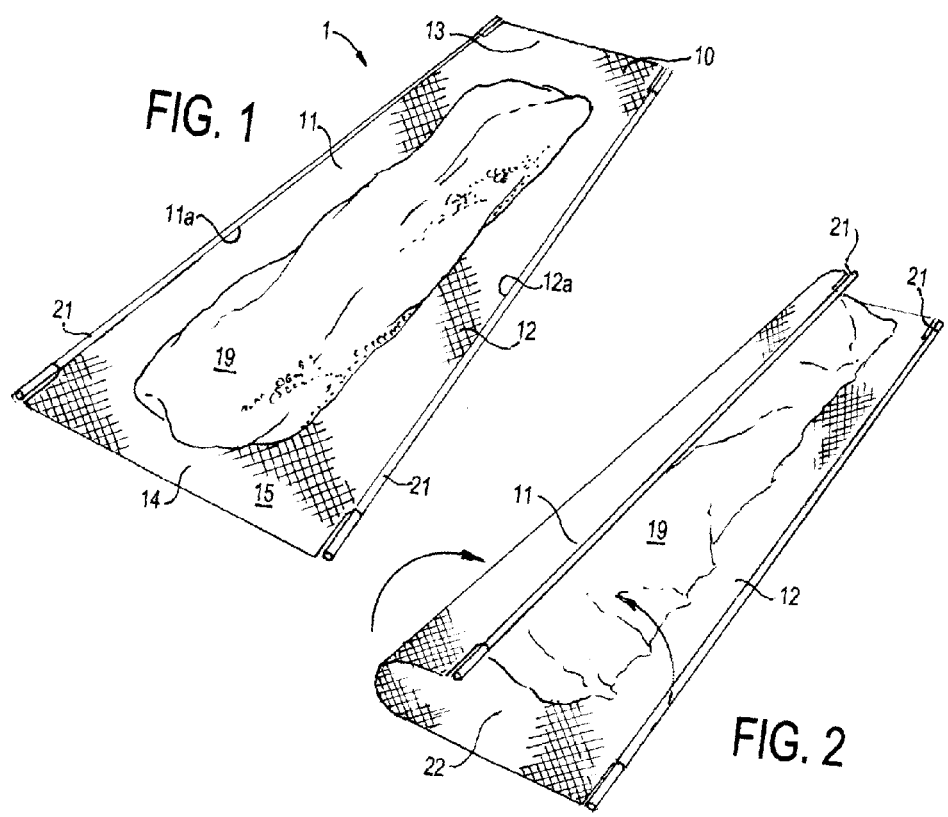
FIG. 1
FIG. 2
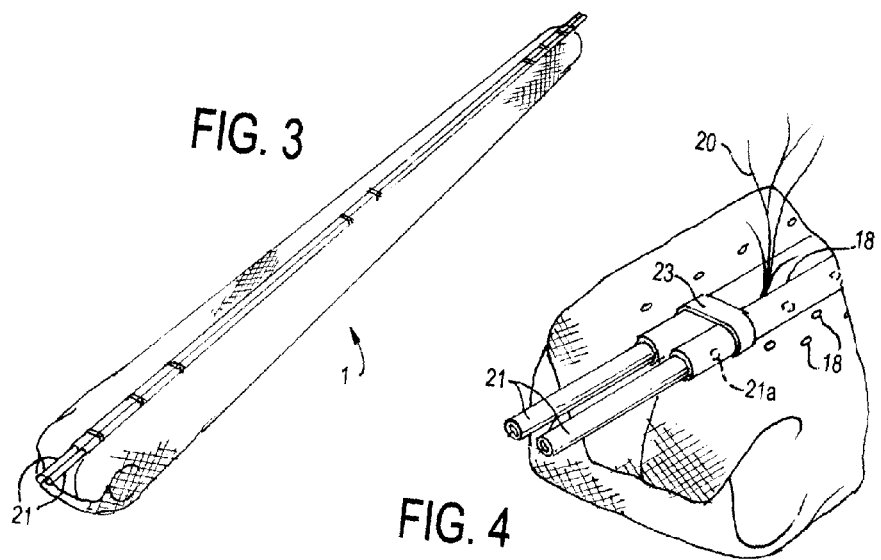
FIG. 3
FIG. 4

AGRICULTURAL WRAP AND METHOD OF MAKING THE SAME

FIELD OF THE INVENTION

The present invention relates to agriculture, and more specifically, to agricultural containers.

BACKGROUND OF THE INVENTION

Agriculture includes the science, art, and practice of cultivating soil, producing crops, and raising livestock. Crops can be planted and grown in fields of soil, as well as in containers. Containers utilized for agricultural purposes have ranged from rigid structures, such as rigid cylinders having closed bottoms, to flexible ones, such as growing bags and other cylindrical enclosures.

For example, pre-formed cylindrical enclosures are disclosed by Tyler in U.S. Pat. Nos. 7,226,240, 7,452,165, and 8,439,607, and in WO 2004/002834 A2 and WO 2004/002834 A3. These containers are provided as a pre-formed cylinder in which growing material can be blown or otherwise disposed into such tubes via a delivery mechanism, such as a hose, tube, pipe, duct, or chute. Such containers suffer from several deficiencies. They require their cylindrical bodies to be pre-formed prior to filling, which does not allow dynamic on-site size selection of such containers. Also, such pre-formed bodies do not readily allow convenient (volume- or content-based) modification of soil or filler within such containers, as they are permanently formed in cylindrical configurations. Further, such containers do not provide hydration elements for hydrating growing matter contained therein, nor do they provide such hydration elements that provide structural support of such containers.

SUMMARY OF THE INVENTION

An object of the present invention is to provide an agriculture wrap and methods of fabricating the same.

In an exemplary embodiment of the present invention, in an agricultural environment having a base surface, an agricultural wrap can include a continuous planar main body, an amount of growing material, and at least one irrigation tube. Such a main body can be formed of a flexible and permeable material, and can have first and second opposing sides with respective terminal edges, first and second ends, an inner surface, an outer surface disposed against the base surface, and at least one aperture that exposes at least a portion of the amount of growing matter, which can be disposed against the inner surface. Such an irrigation tube can be attached to one of the first and second sides, with a volume of water retained therein. The first and second sides can be positioned around the growing matter, and in conjunction with the ends, can define a holding pocket, and can encapsulate the growing matter within the holding pocket, with the at least one irrigation tube being disposed, against the main body, and above the base surface. At least a portion of the volume of water can, be released by the at least one irrigation tube, permeate through the main body, and hydrate the growing matter.

In an exemplary aspect of the present invention, the at least one aperture can be formed by cutting the material with an appropriate cutting instrument, such as scissors, a punch, etc.

In another exemplary embodiment of the present invention, an agricultural wrap can further comprise a second irrigation tube attached to the other of the first and second sides.

In a further exemplary aspect, the sides can overlap each other with either side overlapping the other.

In another exemplary aspect, the terminal edges can define a gap therebetween and provide the at least one aperture.

In yet another exemplary aspect, one or more of the terminal edges can define the at least one aperture, such as when one or both edges include a cut-out portion that provides an aperture when the sides are positioned as described herein.

In another exemplary embodiment of the present invention, an agricultural wrap can further comprise at least one fixing structure, such as a stake, for example and not in limitation, disposed through the first and second sides, and optionally, the amount of growing matter, to secure the first and second opposing sides in a static position.

In a further exemplary aspect, the at least one fixing structure can be further disposed through the base surface.

In still yet another exemplary aspect, the at least one fixing structure can include a first leg attached to a second leg, with the first leg being disposed through the first side and the second leg being disposed through the second side.

In another exemplary embodiment of the present invention, in an agricultural environment having a base surface, a method of forming an agricultural wrap, having a continuous planar main body, formed of a flexible and permeable material, and having first and second opposing sides with respective terminal edges, first and second ends, an inner surface, an outer surface, and at least one aperture that exposes at least a portion of an amount of growing matter, can include the following steps:

disposing the main body against the base surface;

placing an amount of growing matter against the inner surface;

attaching, to one of the first and second sides, at least one irrigation tube having a volume of water retained within the at least one irrigation tube; and positioning the first and second sides around the amount of growing matter to define, in conjunction with the first and second sides, a holding pocket and to encapsulate the amount of growing matter within the holding pocket. Further, the at least one irrigation tube can be disposed, against the main body, and above the base surface, and at least a portion of the volume of water the amount of growing matter can include at least a portion of the volume of water.

The following are additional exemplary optional aspects of the present invention: such a method can further include after the step of positioning, cutting the material to form the at least one aperture; the other of the first and second sides can include a second irrigation tube attached thereto; the step of positioning can result in the sides overlapping each other; the terminal edges can define a gap therebetween; one or more of the terminal edges can define the at least one aperture; such a method can further include after the step of positioning, forcing at least one fixing structure through the first and second opposing sides and the amount of growing matter to secure the first and second opposing sides in a static position; the step of forcing can include forcing the at least one fixing structure through the base surface; and the at least one fixing structure can include a first leg attached to a second leg, and such a method can further include after the step of positioning, forcing the first leg through the first side and the second leg through the second side.

BRIEF DESCRIPTION OF THE DRAWINGS

FIG. 1 illustrates an exemplary agricultural wrap in an initial state prior to the sides being positioned around the growing matter.

FIG. 2 illustrates an exemplary positioning of a side.

FIG. 3 illustrates an exemplary agricultural wrap post-positioning of its sides with at least one irrigation tube disposed against the main body to facilitate the transfer of water to the growing matter.

FIG. 4 illustrates an exemplary wrap with a clamp to statically position the sides and with plural apertures, through which a plant can grow.

DETAILED DESCRIPTION

Figure 5:
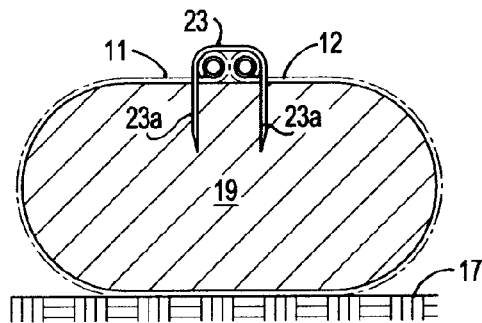
FIG. 5 illustrates an exemplary utilization of a fixing structure to maintain the sides in a static position.
Figure 6:
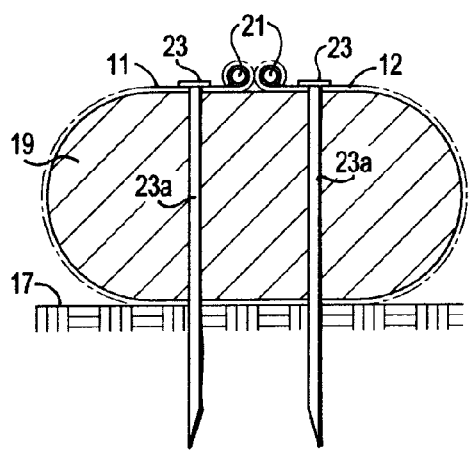
FIG. 6 illustrates an exemplary utilization of two separate fixing structures to maintain the sides and the agricultural wrap in a static position.

It is an object of the present invention to provide an agricultural wrap.

It is another object of the present invention to provide an agricultural wrap from which one or more plants can be grown.

It should be noted that this disclosure includes a plurality of embodiments each having a plurality of elements and/or aspects, and such elements and/or aspects need not necessarily be interpreted as being conjunctively required by one or more embodiments of the present invention. In particular, all combinations of elements and/or aspects can enable a separate embodiment of a patentable invention, which may be claimed with particularity in this or any future filed Patent Applications. Moreover, such elements and/or aspects disclosed herein, whether expressly or implicitly, are to be construed strictly as illustrative and enabling, and not necessarily limiting. Therefore, it is expressly set forth that any elements and/or aspects, independently or in any combination of one of more thereof, are merely illustratively representative of one or more embodiments of the present invention and are not to be construed as necessary in a strict sense.

Further, to the extent the same element and/or aspect is defined differently anywhere within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

The present invention provides an agricultural wrap from which one or more plants can be grown. Accordingly, such a wrap can advantageously provide a growing environment in one or more desired environments.

FIG. 1 illustrates an exemplary embodiment of the present invention, in which an exemplary agricultural wrap 1 prior to final configuration can include a continuous planar main body 10 formed of a flexible material (such as a woven mesh, for example and not in limitation) that is sufficiently permeable, such that water can move therethrough. In an exemplary aspect, permeability can arise via spaces between a woven or porous material. Further, main body 10 can include first and second opposing sides 11, 12 having respective terminal edges 11a, 12a, first and second ends 13, 14, an inner surface 15, an outer surface (not shown, but opposite the inner surface) disposed against a base surface 17 (which can include any structural surface upon which wrap 1 can be placed, such as a dirt, wooden, concrete, plastic, rubber, crystalline, or metal surface, etc.), and at least one aperture 18 (illustratively shown in FIG. 4). Notably, main body 10 can be cut or trimmed so as to dynamically adjust its size on-site.

As further illustrated in FIG. 1, wrap 1 can further include an amount of growing matter 19 disposed against inner surface 15, with at least a portion of the growing matter being accessible via the at least one aperture 18. Notably, accessibility includes sufficient space for a plant to pass from growing matter 19 to an area outside of wrap 1. As illustrated in FIG. 4, such accessibility can allow a plant 20 to grow from growing matter 19 and extend through aperture 18, so as to be exposed to natural or artificial sunlight outside of wrap 1. Notably, as also illustrated in FIG. 4, aperture 18 can include an opening between the terminal portions of first and second sides 11, 12 (which can be a trough, for example and not in limitation) and/or one or more apertures 18 within main body 10, which can be stamped, punched, or otherwise cut into any portion of the main body. As also illustrated, wrap 1 can include at least one irrigation tube 21 that can be attached to one of the first and second sides 11, 12, with such attachment being effectuated via any desired one or more means, such as an adhesive, static friction via wrapping of a side around a tube, a clamp, a staple, a stitch, etc., insofar as the same is functionally compatible with the present invention. Notably, as illustrated, wrap 1 can optionally include at least one tube 21 for each side 11, 12. In an exemplary aspect of the present invention, irrigation tube 21 can optionally function as a handhold or grasping structure when attached to one of first and second sides 11, 12, and thus can be used to pull or otherwise physically manipulate one or both of the first and second sides, which can facilitate the positioning of the one or both sides.

As illustrated in FIG. 2, with growing matter 19 disposed against inner surface 15, first and second sides 11, 12 can be positioned around the growing matter, with the sides and ends 13, 14 defining a holding pocket 22 for retaining or holding the growing matter. In another exemplary aspect of the present invention, irrigation tube 21 can be disposed against main body 10 and above base surface 17. Thus, irrigation tube 21, which can carry and hold a volume of water, can release at least a portion of the water via at least one hole 21a (illustratively shown in FIG. 4), which can then permeate through main body 10 and desirably hydrate growing matter 19 to facilitate a growing process. Notably, irrigation tube 21 can be provided as any type of known or apparent irrigation tube insofar as the same is functionally compatible with the present invention, and can be formed from a permeable material, which can inherently include at least one hole, or a non-permeable material with a provided at least one hole. Further, tube 21 is not necessarily limited to a rounded cross-section, as any functionally compatible shape can be utilized.

Figure 7:
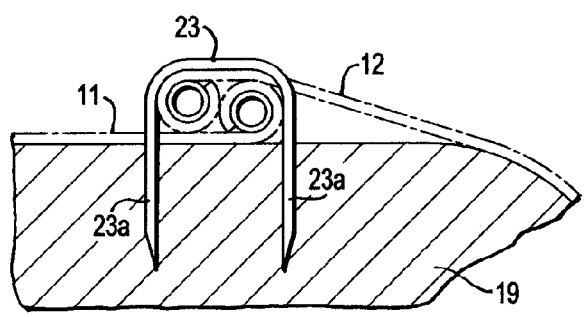
FIG. 7 illustrates another exemplary utilization of a fixing structure having first and second legs, in which a pair of irrigation tubes are disposed between the legs.
Figure 8:
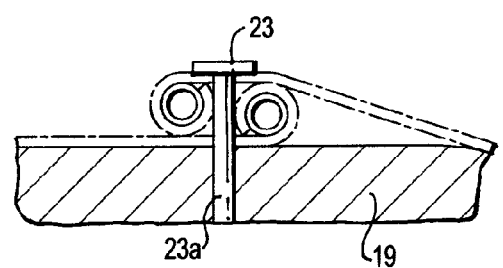
FIG. 8 illustrates yet another exemplary utilization of a fixing structure having a single leg, in which a pair of irrigation tubes and sides are positionally maintained via the single leg.

FIGS. 3 and 4 illustrate an exemplary wrap 1 after an exemplary positioning of sides 11, 12. As illustrated, the terminal edges of sides 11, 12 can be positioned to meet each other (whether touching or not); however, it should be noted that such edges can be positioned such that one overlaps the other, as illustratively shown in FIGS. 7 and 8, insofar as desired.

In another exemplary aspect of the present invention, at least one of ends 13, 14 can be configured to be closed (as illustrated in FIGS. 3 and 4) or open (as illustrated in FIGS. 5-8). A closed configuration can be effectuated by folding ends 13, 14, with or without a fixing structure (as described below) or fixing the same together via a fixing structure. An open configuration can facilitate aeration, for example and not in limitation.

Figure 9:
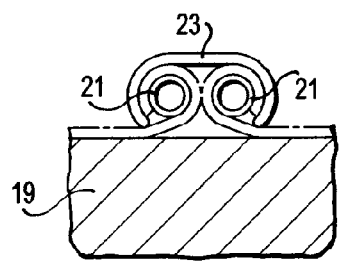
FIG. 9 illustrates yet another exemplary utilization of a fixing structure, which is illustratively shown as a clamp, in which a pair of irrigation tubes attached to ends are clamped therewith, so as to positionally maintain the tubes and sides.

In another exemplary aspect of the present invention, after positioning, first and second sides 11, 12 can be positionally fixed via at least one fixing structure 23. Notably, such fixation can be temporary, in that such fixation can be undone to allow subsequent physical manipulation of growing matter 19, and thereafter reapplied to positionally fix first and second sides 11, 12 as desired. For example, and not in limitation, fixing structure 23 can include any functionally compatible structure that positionally fixes first and/or second side 11, 12, such as a clamp that holds together a pair of irrigation tubes 21 attached to the sides (as illustratively shown in FIGS. 4 and 9) or a stake having one or more legs 23a that can penetrate through main body 10, and optionally, growing matter 19 (as illustratively shown in FIGS. 5-8), and further optionally, base surface 17. Further, either side 11, 12 can be fixed concurrently or successively via at least one fixing structure 23. For example and not in limitation, one of first and second sides 11, 12 can be fixed with one or more fixing structures 23, such as with a stake forced through main body 10, followed by the other of the first and second sides being pulled over the fixing structure(s) and another one or more fixing structures 23 being forced through main body 10.

As apparent from the above, a method of forming wrap 1 can include disposing main body 10 against a base surface 17; placing the amount of growing matter 19 against inner surface 15; attaching, to at least one of first and second sides 11, 12, at least one irrigation tube 21 having a volume of water retained therein; and positioning the first and second sides around the growing matter to define holding pocket 22 and to encapsulate the growing matter within the holding pocket. Accordingly, the at least one irrigation tube 21 can be disposed against main body 10 and above the base surface 17, such that water (not shown) released by irrigation tube 21 can permeate the main body and saturate the growing matter.

While terminal edges 11a, 11b can define the at least one aperture 18, one or more apertures can optionally be provided by cutting the material from which main body 10 is formed.

In an optional aspect, a method of forming wrap 1 can include, after the step of positioning, forcing at least one stake 23 through sides 11, 12 and the growing matter 19 to secure the sides in a static position. Further optionally, stake 23 can be forced through base surface 17, which can positionally maintain wrap 1 in a static position relative to the base surface. Notably, at described above, a fixing structure 23 provided as a clamp can be utilized insofar as desired and as described above.

As illustrated in FIG. 5-8, stake 23 can be forced through main body 10 with various positional configurations of first and second ends 11, 12, and such various configurations can include any known or apparent configuration given the scope of this disclosure.

Notably, in any embodiment of the present invention, the various elements can be provided in any desired shape and/or size that are functionally compatible with the present invention as described and/or claimed, and as expressly stated, are not necessarily limited to any particular shape or size illustratively described herein. Accordingly, exemplary shapes and/or sizes can include any shape or size having one or more geometric shapes, whether having symmetric or asymmetric portions, and without shape or size limitations relative to other elements unless necessary to the functionality of the present invention.

Further, it is expressly set forth that any structural element and/or aspect described herein can be formed from any one or more desired materials that provide functional compatibility with the respective element and/or the respective aspect related thereto. Thus, any one or more of a plastic, rubber, metal, wood, elastomer, crystalline material, man-made material, naturally-occurring material, synthetic, mesh, woven material, etc. may be utilized insofar as respectively compatible.

Also notably, to the extent any two elements of the present invention are attached, connected, or fixed to each other or to another structure, any one or more attachment, connection, or fixation structures can be utilized to effectuate such attachment, connection, or fixation, including but not limited to, an adhesive, rope, twine, a strap, a clamp, a nail, a screw, a bolt, a nut, a magnet, etc., and are expressly not limited to any particular attachment, connection, or fixation structure illustrative shown or described, insofar as the same is functionally compatible herewith.

It will be apparent to one of ordinary skill in the art that the manner of making and using the claimed invention has been adequately disclosed in the above-written description of the exemplary embodiments and aspects.

It should be understood, however, that the invention is not necessarily limited to the specific embodiments, aspects, arrangement, and components shown and described above, but may be susceptible to numerous variations within the scope of the invention.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents of the appended claims.

Therefore, I claim:

1. In an agricultural environment having a base surface, an agricultural wrap, comprising:
    a continuous planar main body formed of a flexible and permeable material, said body having first and second opposing sides with respective terminal edges, first and second ends, an inner surface, an outer surface disposed against the base surface, and at least one aperture;
    an amount of growing matter disposed against the inner surface, with at least a portion of said amount of growing matter being exposed via the at least one aperture; and
    at least one irrigation tube attached to one of the first and second sides, with the one of the first and second sides, including the respective terminal edge, wrapped around said at least one tube and said at least one tube having a volume of water therein and at least one hole;
    wherein the first and second sides, are positioned around said amount of growing matter, the first and second sides define, in conjunction with the first and second ends, a holding pocket, and the first and second sides encapsulate said amount of growing matter within the holding pocket, with said at least one irrigation tube being disposed, against the one of the first and second sides, and above said amount of growing matter, and said amount of growing matter includes at least a portion of the volume of water transferred from the at least one hole and through said main body.

2. The agricultural wrap of claim 1, wherein the at least one aperture is formed by cutting the material.

3. The agricultural wrap of claim 1, further comprising a second irrigation tube attached to the other of the first and second sides.

4. The agricultural wrap of claim 1, wherein one of the first and second sides overlap the other.

5. The agricultural wrap of claim 1, wherein the terminal edges define a gap therebetween.

6. The agricultural wrap of claim 1, wherein one or more of the terminal edges define the at least one aperture.

7. The agricultural wrap of claim 1, further comprising at least one stake disposed through the first and second opposing sides and said amount of growing matter to secure the first and second opposing sides in a static position.

8. The agricultural wrap of claim 7, wherein said at least one stake is further disposed through the base surface.

9. The agricultural wrap of claim 7, wherein the at least one stake includes a first leg attached to a second leg, with the first leg being disposed through the first side and the second leg being disposed through the second side.

10. The agricultural wrap of claim 1, wherein the at least one irrigation tube is attached to another irrigation tube via a clamp.

11. In an agricultural environment having a base surface, a method of forming an agricultural wrap, having a continuous planar main body, formed of a flexible and permeable material, and having first and second opposing sides with respective terminal edges, an inner surface, an outer surface, and at least one aperture that exposes at least a portion of an amount of growing matter, comprising steps of:
  disposing the main body against the base surface;
  placing an amount of growing matter against the inner surface;
  attaching, to one of the first and second sides, at least one irrigation tube having a volume of water retained within the at least one irrigation tube, with the one of the first and second sides, including the respective terminal edge, wrapped around the at least one tube; and
  positioning the first and second sides around the amount of growing matter to define a holding pocket and to encapsulate the amount of growing matter within the holding pocket;
  wherein the at least one irrigation tube is disposed, against the one of the first and second sides, and above the amount of growing matter, and the amount of growing matter includes at least a portion of the volume of water.

12. The method of claim 11, further comprising:
  after said step of positioning, cutting the material to form the at least one aperture.

13. The method of claim 11, wherein the other of the first and second sides includes a second irrigation tube attached thereto.

14. The method of claim 11, wherein one of the first and second sides overlaps the other.

15. The method of claim 11, wherein the terminal edges define the at least one aperture therebetween.

16. The method of claim 11, further comprising:
  after said step of positioning, forcing at least one stake through the first and second opposing sides and the amount of growing matter to secure the first and second opposing sides in a static position.

17. The method of claim 16, wherein said step of forcing includes forcing the at least one stake through the base surface.

18. The method of claim 16, wherein the at least one stake includes a first leg attached to a second leg, and the method further comprises:
  after said step of positioning, forcing the first leg being through the first side and the second leg through the second side.

19. The method of claim 11, further comprising:
  fixing the at least one irrigation tube to another irrigation tube via a clamp.

* * * * *